United States Patent [19]

Wernsing

[11] 4,216,296

[45] Aug. 5, 1980

[54] LOW SMOKE GENERATING POLYURETHANE FOAM

[75] Inventor: David G. Wernsing, Littleton, Colo.

[73] Assignee: Johns-Manville Corporation, Denver, Colo.

[21] Appl. No.: 920,750

[22] Filed: Jun. 26, 1978

[51] Int. Cl.$^2$ .................... C08G 18/48; C08G 18/14
[52] U.S. Cl. .................. 521/175; 521/129; 521/167; 521/903; 428/315
[58] Field of Search ............... 521/129, 167, 175, 903

[56] References Cited

U.S. PATENT DOCUMENTS

| | | | |
|---|---|---|---|
| 3,597,371 | 8/1971 | Britain | 521/167 |
| 3,741,921 | 6/1973 | Lapkin | 521/175 |
| 3,779,953 | 12/1973 | Papa et al. | 521/175 |

Primary Examiner—H. S. Cockeram
Attorney, Agent, or Firm—Robert M. Krone; Joseph J. Kelly; James W. McClain

[57] ABSTRACT

A polyurethane foam composition is disclosed which has low smoke generation characteristics (i.e., a rating of less than 50 in the ASTM E-84 Tunnel Test). The composition comprises 80–100 parts by weight of poly(-trichloro-oxybutylene) carbohydrate adduct, 0–20 parts by weight of an amine-based polyol, 80–155 parts by weight of a polyalkylene polyphenyl isocyanate, 10–50 parts by weight of a fluorcarbon foaming agent, 0.3–3.0 parts by weight of a surfactant, and 0.005–4.0 parts of a catalyst. The foam finds use as a thermal insulation, particularly pipe insulation.

6 Claims, No Drawings

LOW SMOKE GENERATING POLYURETHANE FOAM

BACKGROUND OF THE INVENTION

The invention herein relates to polyurethane foams, particularly of the type suitable for use as thermal insulation.

Polyurethane foams used for thermal insulation may in many field uses be subject to burning. These foams are commonly rated for combustion hazard properties by a standard test known as the "tunnel test" and described in ASTM Standard Test Method E-84, "Surface Burning Charcteristics of Building Materials." Polyurethane foams normally have flame spread ratings in this test of less than 25, which is considered to be a good rating. On the other hand, conventional polyurethane foams normally have smoke generation ratings in this test in the range of 100 to 200, which represents major amounts of smoke generation. Since when a fire occurs where polyurethane insulation is being used this excessive smoke generation can present a major hazard to fire fighting efforts, it would be very desirable to have a polyurethane foam which has a low smoke generation rating (defined as less than 50 in the tunnel test).

SUMMARY OF THE INVENTION

The invention herein comprises a polyurethane foam composition having a smoke generation value in the ASTM E-84 Tunnel Test of less than 50 and comprising, in parts by weight:

| | |
|---|---|
| poly(trichloro-oxybutylene) carbohydrate adduct | 80–100 |
| amine-based polyol | 0–20 |
| polyalkylene polyphenyl isocyanate | 80–155 |
| fluorocarbon foaming agent | 10–50 |
| surfactant | 0.3–3.0 |
| catalyst | 0.005–4.0 |

DETAILED DESCRIPTION AND PREFERRED EMBODIMENTS

The polyurethane foam of this invention is formed from the reaction of the poly(trichloro-oxybutylene) carbohydrate adduct (which may be supplemented with amine-based polyol) and the polyalkylene polyphenyl isocyanate. In the present composition the carbohydrate adduct is a critical ingredient, for the low smoke generation of the present product can be attributed largely to its inclusion in the polyurethane polymer. A material of this type is commercially available from Olin Chemical Company under the name "Thermolin RF-230". This material is the basic material upon which the amounts of the other constituents are based, and it will be present in the composition as between 80 and 100 parts by weight.

The carbohydrate adduct may be supplemented to a minor extent by the inclusion of a highly reactive amine-based polyol. Such a material is that commercially available from Olin Chemical Company under the name "Poly GX 431". The polyol may be present in any amount from 0 to 20 parts by weight.

The second major component of the invention is a polyalkylene polyphenyl isocyanate such as polymethylene polyphenyl isocyanate. This material reacts with the carbohydrate adduct (and polyol if any is present) to form the urethane polymer. The amount of isocyanate needed will therefore be based upon the amount necessary to react with the adduct and polyol. Stoichiometrically, only one mole of isocyanate is required to react with each mole of the adduct and polyol combination, although it is common practice in forming polyurethane foams to add excess isocyanate to ensure complete reaction. In the present formulation an amount of excess isocyanate up to approximately 1.3 equivalents of isocyanate per equivalent of adduct/polyol combination may be used. (Conventional polyurethane terminology designates "100 index" as being the stoichiometric amount of isocyanate required to react with the other reactive materials, including polyol, water and fire retardants. Higher "index" numbers represent excess isocyanate, so that in the present case 1.3 equivalents of isocyanate would be termed "130 index".)

The composition herein will also contain a fluorocarbon foaming or "blowing" agent in an amount of from 10 to 50 parts by weight. Typical foaming agents include trichloromonofluoro methane and similar fluorocarbons. If water is present in the composition (which it may be in amounts of from 0.1 to 2 parts by weight) the reaction of water with isocyanate will generate carbon dioxide which will also function as a foaming agent.

The polymer forming reaction may be catalyzed by any conventional polyurethane forming catalyst, including tertiary amines or dialkyl tin coupounds. Typical of catalyst which may be used in one commercially available from Abbot Laboratories under the name "Polycat 8" and which is dimethyl cyclohexyl amine. The catalyst will be present in amounts of from 0.005 to 4.0 parts by weight.

Also present will be a surfactant, particularly a silicone glycol copolymer and polyalkyleneoxy glycol. A preferred silicone glycol polymer are those commercially available from Dow Corning Company under the designation "DC 193." Similar silicone surfactants commercially available from various companies under designations such as "L-5420", "LK-221", and "DC 195" may also be used. A typical polyalkyleneoxy glycol surfactant suitable for use herein is that commercially available from Air Products and Chemicals, Inc. under the designation "LK-221." The surfactant will be present in amounts of from 0.3 to 3 parts by weight.

If desired, the composition may also contain additives to enhance fire retardancy or smoke suppression. These include materials such as aliphatic acids, ferrocene, phosphorus containing polyols, phosphates, and chlorendic anhydride adducts. These materials will be present in limited amounts not to exceed 10 parts by weight total.

The foam is formed in a conventional manner by the reaction of the components in the presence of the catalyst. Commonly the composition is placed into two mold halves when pipe insulation is desired. The mold is closed and the foam is allowed to cure in place at temperatures ranging from ambient to 250° F. for approximately 2 to 15 minutes. Such mold forming allows the formation in a single operation of polyurethane insulation sections with semicylindrical shapes and with formed joints such as ship-lap joints and, if desired, with attached facing materials such as foil, foil/scrim/kraft, vinyl coated kraft, and similar materials.

A composition of this invention was formed from the following materials:

| Component | Parts by Weight |
|---|---|
| "Thermolin RF-230" adduct (93%*) | 96.8 |
| "Poly GX 431" polyol | 10.0 |
| Polymethyl polyphenyl isocyante | 106.9 |
| Fluorocarbon ("11B") | 31.2 |
| "DC 193" silicone | 1.2 |
| "Polycat 8" catalyst | 2.0 |

*contained 7% fluorocarbon liquid to reduce viscosity

This material was molded into an experimental sample of 1-½ inch thick thermal insulation in the laboratory. In the ASTM E-84 Test, this sample had a flame spread value of 15 and a smoke generation value of 40.

What is claimed is:

1. A composition for the formation of polyurethane foam which has low smoke generation characteristics and which comprises, in parts by weight:

| | |
|---|---|
| poly(trichloro-oxybutylene) carbohydrate adduct | 80–100 |
| amine-based polyol | 1–20 |
| polyalkylene polyphenyl isocyanate | 80–155 |
| fluorocarbon foaming agent | 10–50 |
| surfactant | 0.3–3.0 |
| catalyst | 0.005–4.0 |

2. A composition as in claim 1 wherein said isocyanate is a polymethyl polyphenyl isocyanate.

3. A composition as in claim 1 wherein said surfactant is a silicone glycol copolymer or a polyalkyleneoxy glycol.

4. A composition as in claim 1 comprising, in parts by weight:

| | |
|---|---|
| poly(trichloro-oxybutylene) carbohydrate adduct | 98.6 |
| amine-based polyol | 10.0 |
| polymethyl polyphenyl isocyanate | 106.9 |
| fluorocarbon foaming agent | 31.2 |
| silicone glycol copolymer surfactant | 1.2 |
| dimethyl cyclohexyl amine catalyst | 2.0 |

5. A polyurethane foam composed of the composition of claim 1.

6. A polyurethane foam composed of the composition of claim 4.

* * * * *

UNITED STATES PATENT AND TRADEMARK OFFICE
CERTIFICATE OF CORRECTION

PATENT NO. : 4,216,296

DATED : August 5, 1980

INVENTOR(S) : David G. Wernsing

It is certified that error appears in the above—identified patent and that said Letters Patent is hereby corrected as shown below:

Column 3, line 6, "isocyante" should be spelled --isocyanate--

Column 3, line 25, line under numbers "1-20" should be deleted.

Column 4, line 16, "98.6" should read --96.8--

Signed and Sealed this

Twenty-fifth Day of November 1980

[SEAL]

Attest:

SIDNEY A. DIAMOND

Attesting Officer

Commissioner of Patents and Trademarks